United States Patent [19]

Teeter

[11] Patent Number: 5,076,826
[45] Date of Patent: Dec. 31, 1991

[54] APPARATUS AND METHOD FOR MAKING GLASS FIBERS

[75] Inventor: Gary C. Teeter, Salem, Oreg.
[73] Assignee: Evanite Fiber Corporation, Corvallis, Oreg.
[21] Appl. No.: 600,428
[22] Filed: Oct. 19, 1990
[51] Int. Cl.⁵ .................................. C03B 37/05
[52] U.S. Cl. ................................ 65/6; 65/8; 65/14; 65/15
[58] Field of Search ................... 65/6, 8, 14, 15

[56] References Cited

U.S. PATENT DOCUMENTS

| | | |
|---|---|---|
| 2,855,626 | 10/1958 | Firnhaber . |
| 3,080,736 | 3/1963 | Mabru et al. ............................ 65/8 |
| 3,114,618 | 12/1963 | Levecque et al. ....................... 65/14 |
| 3,174,182 | 3/1965 | Duncan . |
| 3,179,507 | 4/1965 | Levecque et al. ....................... 65/12 |
| 3,285,723 | 11/1966 | Levecque et al. ....................... 65/15 |
| 3,346,356 | 10/1967 | Anderson et al. ...................... 65/14 |
| 3,372,011 | 3/1968 | Porter ................................... 65/14 |
| 3,547,610 | 12/1970 | Holman .................................. 65/7 |
| 3,650,716 | 3/1972 | Brossard ................................ 65/6 |
| 3,746,524 | 7/1973 | Kirchheim .............................. 65/6 |
| 4,046,539 | 9/1977 | Pitt ........................................ 65/6 |
| 4,359,444 | 11/1982 | Shah et al. ............................ 264/518 |
| 4,478,624 | 10/1984 | Battigelli et al. ...................... 55/8 X |
| 4,601,742 | 7/1986 | Kaveh .................................... 65/14 |
| 4,627,868 | 12/1986 | Kaveh .................................... 65/6 |
| 4,678,490 | 7/1987 | Miller et al. ........................... 65/14 |
| 4,832,723 | 5/1989 | Shisler et al. .......................... 65/14 |
| 4,909,817 | 3/1990 | Gill et al. .............................. 65/8 |

*Primary Examiner*—Robert L. Lindsay
*Attorney, Agent, or Firm*—Klarquist, Sparkman, Campbell, Leigh & Whinston

[57] ABSTRACT

A duct assembly is employed for directing a central air flow upwardly against the rotating spinner of a conventional fiberizer mechanism that produces a downwardly falling veil of fibers. The central air flow eliminates the low-pressure zone that normally occurs beneath the spinner assembly of conventional fiberizers. The central air flow is sufficiently cool to rapidly reduce the temperature of the fiber veil thereby to increase the tensile strength and elongation of the paper sheets produced from the fibers.

18 Claims, 3 Drawing Sheets

APPARATUS AND METHOD FOR MAKING GLASS FIBERS

TECHNICAL FIELD

This invention relates to an improved apparatus and method for making fibers from thermoplastic material.

BACKGROUND INFORMATION

One process for producing very small diameter fibers from thermoplastic material, such as glass, polyester, or polypropylene, is known as the rotary fiberization process. Apparatus for producing fibers by the rotary fiberization process are described in U.S. Pat. Nos. 4,046,539 and 4,627,868. These apparatus are commonly referred to as "fiberizers."

A rotary-type fiberizer includes mechanisms for directing molten thermoplastic material, such as glass, into a rapidly rotating fiberizer spinner. The spinner has a plurality of small openings formed through its radially peripheral wall. The molten glass is forced out of the openings by the centrifugal force that is generated by the rotating spinner.

The fiberizer also includes an annular nozzle that surrounds the rotating spinner and is shaped to direct heated gas downwardly against the streams of molten glass that emanate from the spinner openings. The gas from the nozzle attenuates the molten glass streams into fine fibers and directs them downwardly. The fibers collectively fall from the spinner in the shape of a generally tubular column known as a veil. The fiber veil falls upon a conveyor surface that moves beneath the fiberizer. The fibers collect as a mat on the conveyor.

Normal operation of a rotary-type fiberizer generates a high-temperature, low-pressure (i.e., below ambient) zone directly beneath the fiberizer spinner. The air flow within the low-pressure zone is such that portions of the fiber veil separate from the veil and are drawn into the zone. These separated portions later flow outwardly against the veil. The separated fibers that flow outwardly from the low-pressure zone stick to the veil as chunks known as "remelt." An excessive accumulation of remelt has a deleterious effect on the quality of the fiber mat.

Irrespective of the type of mechanism used for forming fibers of thermoplastic material, the fibers are often used in the manufacture of paper products, and it is desirable that the fibers provide in the sheet relatively high tensile strength, elongation, and energy absorption.

SUMMARY OF THE INVENTION

This invention is directed to an improved apparatus and method for making fibers from thermoplastic material, such as glass. The invention is primarily concerned with the elimination of the low-pressure zone beneath the fiberizer spinner that normally forms during operation of the fiberizer. To this end, a duct assembly is located beneath the fiberizer spinner. An open end of the duct assembly is located near the fiberizer spinner assembly, and the duct assembly extends downwardly from the open end, concentric with the vertical rotational axis of the spinner. The duct assembly delivers a column of gas upwardly against the underside of the spinner assembly so that the gas is deflected by the spinner assembly against the inside of the fiber veil that descends from the fiberizer. The upward flowing column of gas prevents the formation of a high temperature, low-pressure zone beneath the fiberizer spinner, thereby substantially reducing the amount of remelt that is produced by the fiberizer.

As another aspect of this invention, the duct assembly includes mechanisms for precisely adjusting the position of the open end of the duct assembly relative to the spinner. Using the adjustment mechanism and varying the pressure of the gas in the duct assembly makes it possible to control the velocity and volume of gas that flows against the interior of the fiber veil so that the temperature and shape of the veil can be controlled.

As another aspect of this invention, the temperature of the gas applied through the duct assembly is maintained slightly below the melting temperature of the glass fibers, thereby quickly cooling the veil to improve the tensile strength and elongation characteristics of paper sheets manufactured from the collected fiber mat.

DESCRIPTION OF THE PREFERRED EMBODIMENT

Figure 1:
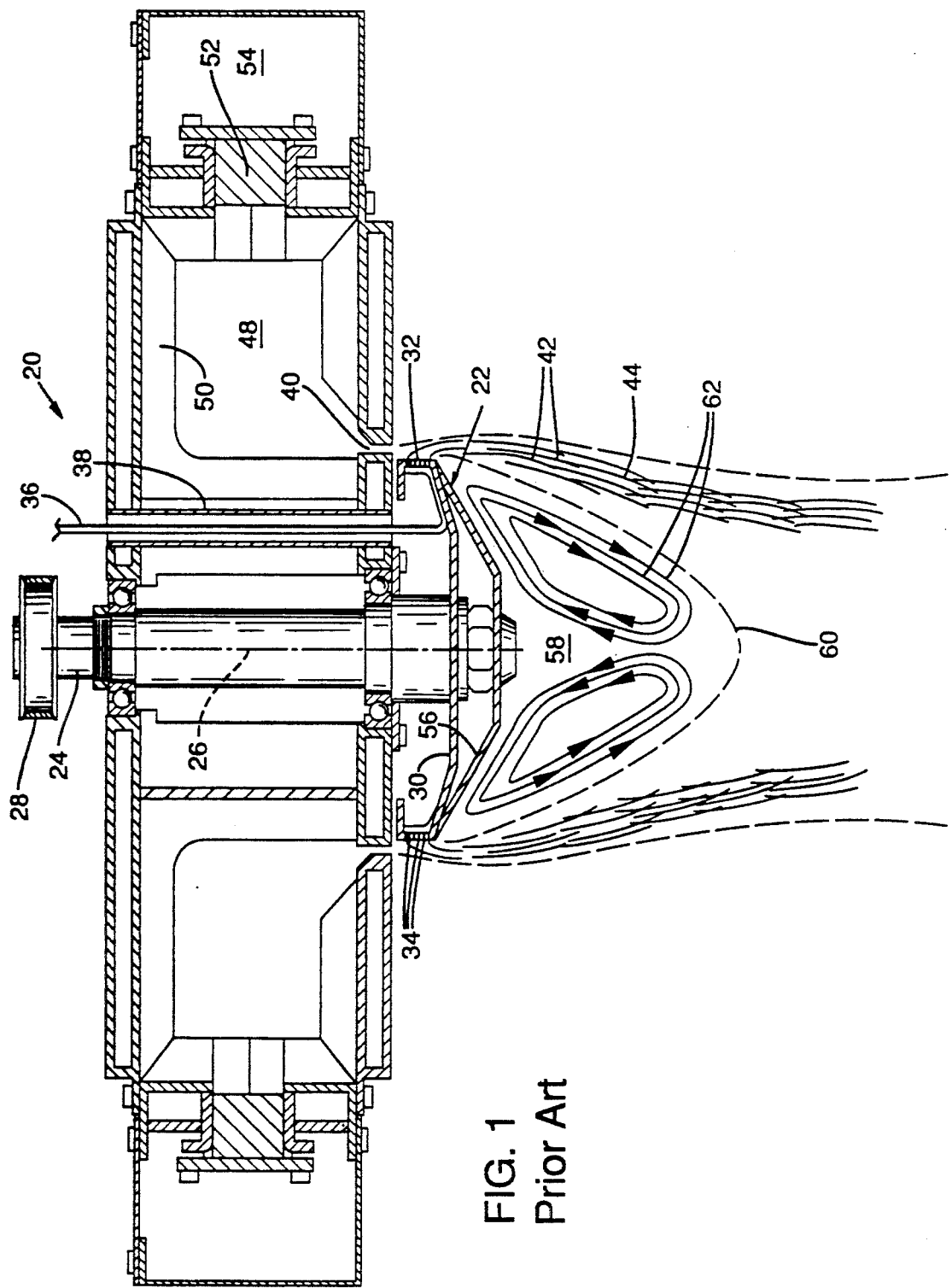
FIG. 1 is a diagrammatic vertical sectional view of a prior art rotary-type fiberizer.

FIG. 1 depicts a conventional fiberizer 20 that includes a spinner assembly 22 that is mounted to a rotatable spindle 24. The spindle 24 is rotated at very high speed about its longitudinal axis 26 by a motor, which is connected to a belt-driven pulley 28 that is mounted to the upper end of the spindle 24.

The spinner assembly 22 rotates with the spindle 24 and includes an internal bowl 30. The radially peripheral wall 32 of the bowl 30 includes a plurality of small-diameter openings 34.

The spinner assembly 22 includes on its underside a heat shield 56. The cross sectional shape of the shield 56 is an inverted frustum. The shield 56 prevents heat loss from the bowl 30 of the spinner assembly 22.

As the spinner assembly 22 is rotated, molten glass 36 is directed through a drop tube 38 in the fiberizer 20 and lands in the bowl 30. The molten glass 36 is driven by centrifugal force through the bowl openings 34.

The streams of molten glass that emanate from the bowl openings 34 pass beneath an annular nozzle 40 that surrounds the rotating spinner assembly 22. A continuous jet of heated gas is forced downwardly through the nozzle 40. The heated gas is provided by combustion of a fuel gas within an annular chamber 48 that is lined with refractory 50. The premixed fuel is supplied through screens 52 that prevent flames from traveling back into the fuel supply manifold 54.

The gas from the nozzle 40 attenuates the molten glass streams into fine fibers 42 and directs them downwardly. The fibers fall from the spinner assembly 22 in the shape of a generally tubular column known as a fiber veil 44. The fiber veil 44 falls upon a conveyor surface 46 that moves beneath the fiberizer (see FIG. 2). The fiber veil 44 collects as a mat on the conveyor surface 46. Alternatively, the gas, air, and fibers may be delivered by conduits to a remote location for collection as a mat.

During operation of the fiberizer 20, a zone 58 of recirculating hot, low-pressure (i.e., below ambient) air is formed immediately beneath the spinner shield 56. The zone 58 is bound by the underside of spinner shield 56 and by a somewhat parabolic outer boundary illustrated as dashed line 60 in FIG. 1.

The air flow within the low-pressure zone 58, as illustrated by air stream arrows 62, defines a generally toroidal path that is centered about the vertical rotational axis 26 of the spinner assembly 22. As discussed earlier, the presence of the low-pressure zone 58 and toroidal air flow therethrough results in some of the fibers 42 being separated from the veil 44 and later returned to the hot veil beneath the nozzle 40 where it remelts, thereby forming "remelt" in the veil. The presence of remelt lowers the quality of the fiber mat that is collected.

Figure 2:
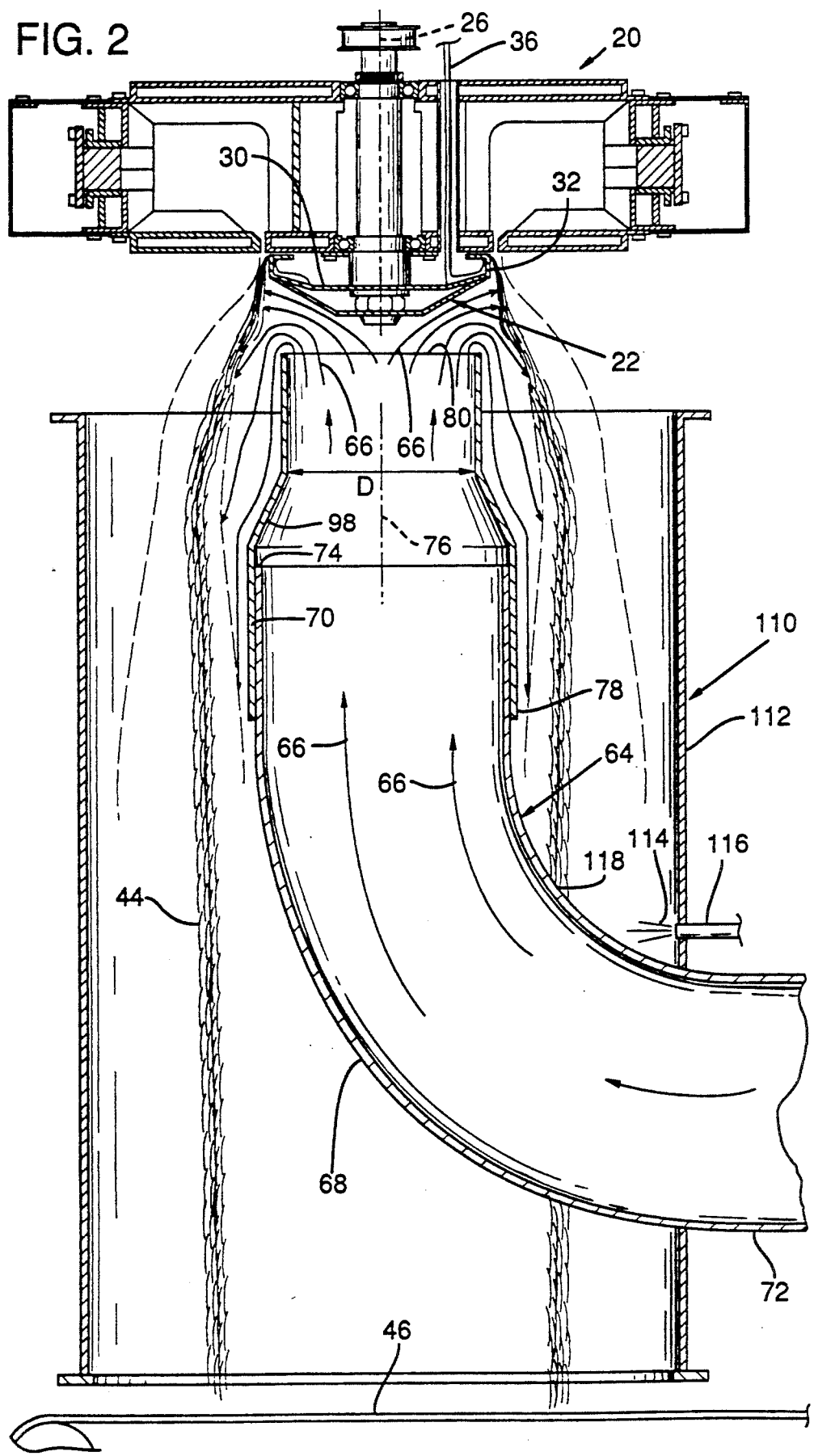
FIG. 2 is a diagrammatic vertical sectional view of an apparatus for making glass fibers in accordance with the present invention.

Referring to FIG. 2, the present invention includes a mechanism for eliminating the low-pressure zone that normally forms beneath the spinner assembly 22 of a conventional fiberizer 20. More particularly, the present invention includes a duct assembly 64 that is configured to direct toward the center of the spinner assembly 22 a continuous flow of gas, such as air. For convenience, the flow of air through the duct assembly 64 will be hereafter referred to as the central air flow as represented by arrows 66.

The duct assembly 64 comprises a riser tube 68 upon the top of which is mounted an end tube 70. The riser tube 68 is generally shaped as a 90° elbow, having a lower end 72 connected with a source of compressed air (not shown) that can be regulated to vary the air pressure within the duct assembly.

The riser tube 68 extends through the lower portion of the tubular fiber veil 44 and curves upwardly within the veil interior. The riser tube 68 is arranged so that the upper end 74 of the riser tube 68 is located beneath the spinner assembly 22. The centerline 76 of the riser tube 68 at the upper end 74 is collinear with the rotational axis 26 of the fiberizer spinner assembly 22.

The lower end 78 of the end tube 70 is mounted to the upper end 74 of the riser tube 68. The upper end 80 of the end tube 70 is circular in cross section and has an inside diameter D that is slightly less than the outside diameter of the bowl 30, as measured between the peripheral walls 32 of the bowl 30. Preferably, the inside diameter D of the upper end 80 of the tube 70 is between about 5% and 30% less that the outside diameter of the bowl 30.

In the preferred embodiment, the end tube 70 includes a tapered portion 98 for increasing the inside diameter of the lower end 78 of the tube 70 to an amount greater than diameter D. Accordingly, the lower end 78 of the end tube will fit around the upper end 74 of the riser tube 68. The riser tube 68 has a greater diameter than the upper end 80 of the end tube 70 so that a sufficient volume of central air 66 may be directed to the spinner assembly 22 regardless of the volume in the riser tube 68 that is occupied by the adjustment mechanisms described below.

Use of a tapered (that is, increasing diameter in the downward direction) of the end tube is also advantageous because it forces the central air radially outwardly as that air moves along the exterior of the end tube 70. The effect of the outward movement of the air is to spread the fiber veil 44 to increase its diameter and surface area for increased efficiency in cooling the veil.

In the preferred embodiment, the end tube 70 is mounted to the riser tube 68 in a manner that permits adjustment of the position of the top 80 of the end tube 70 relative to the spinner assembly 22 to vary the characteristics of the central air flow 66.

Figure 3:
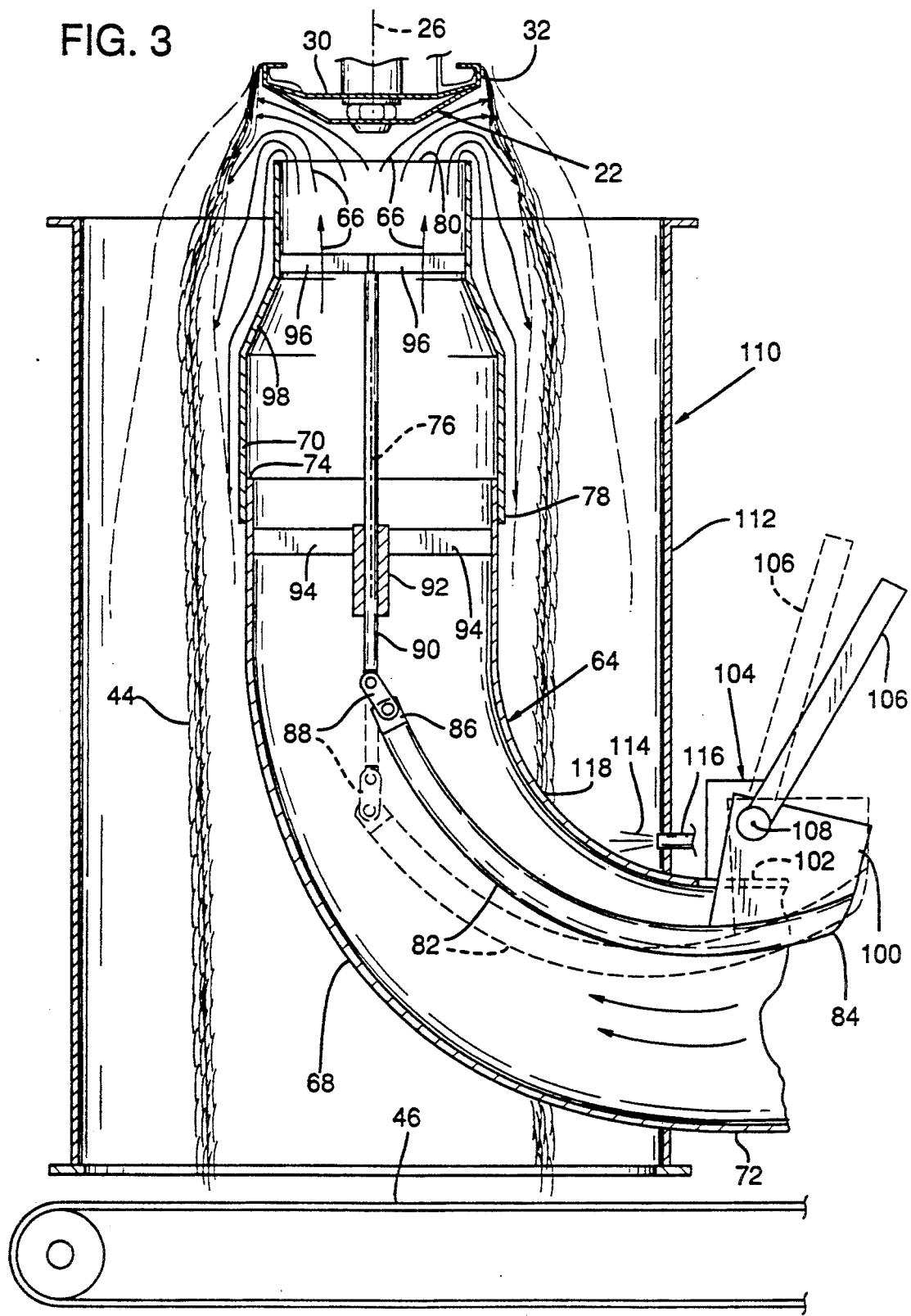
FIG. 3 is a diagrammatic vertical sectional view of the apparatus of FIG. 2, showing mechanisms for adjusting the position of the apparatus relative to the fiberizer.

Referring the FIG. 3, a preferred mechanism for adjusting the end tube position includes a rigid, curved adjustment arm 82 that is mounted to the riser tube 68 in a manner such that an outer end 84 of the arm 82 may be cranked so that the inner end 86 of the arm moves upwardly or downwardly within the riser tube.

The inner end 86 of the adjustment arm 82 is linked, via a conventional chain-type link 88 to the flattened lower end of an adjustment rod 90. The central longitudinal axis of the adjustment rod 90 is collinear with the centerline 76 of the riser tube upper end 74. In this regard, the rod 90 is mounted to slide through a guide bearing 92 that is secured near the riser tube upper end 74 concentric with centerline 76. The bearing is secured by struts 94 that extend radially between the guide bearing 92 and the inner wall of the riser tube upper end 74.

The upper end of the control rod 90 includes radially extending struts 96 fastened to the rod 90 and to the inner wall of the end tube 70. Accordingly, as the inner end 86 of the adjustment arm 82 is moved upwardly or downwardly, the end tube 70 is forced upwardly or downwardly, telescopically sliding along the upper end 74 of the riser tube 68.

The outer end 84 of the arm 82 is connected to a plate 100 that extends through a slot 102 formed in the lower end 72 of the riser tube 68. A conventional worm gear mechanism 104 is mounted to the exterior of the riser tube 68 and is connected to the plate 100 so that rotation of the handle 106 of the worm gear mechanism 104 rotates the connected arm 82 about a crank axis 108 that passes through (i.e., perpendicular to the plane of FIG. 3) the plate 100. The curvature of the arm 82 is such that rotation of the arm about the crank axis 108 produces the upward or downward motion of the inner end 86 of the arm as described above.

The duct assembly 64, connected and arranged as just described, directs a sufficient volume of central air 66 upwardly against the underside of the spinner assembly 22 so that the central air 66 is deflected by the spinner assembly 22 against the interior of the tubular fiber veil 44. It can be appreciated that the presence of the duct assembly 64 and upward central air flow 66 prevents the formation of any low-pressure zone (with attendant toroidal air circulation) beneath the spinner assembly 22. As a result, the amount of remelt occurring within the fiber veil is substantially reduced relative to the amount that would occur in the absence of the central air flow.

It is preferred that the source of the central air flow 66 is developed at or below ambient temperature. The relatively cool (that is, with respect to the temperature of the fiber veil 44) central air flow quickly lowers the temperature of the fiber veil 44 to below the melting temperature of the fibers 42. The application of the cool air as just described increases the tensile strength and the elongation of the paper sheets manufactured from the fibers 42.

The pressure of the central air flow, and the position of the upper end 80 of the end tube 70 relative to the spinner assembly 22 are adjusted so that the velocity of the central air 66 that impinges upon the interior of the veil 44 is sufficient to prevent the formation of a low-pressure zone adjacent to the spinner assembly 22 and to increase the veil diameter and to direct the veil 44 away from the exterior surfaces of the end tube 70 and the upper end 74 of the riser tube 68. For example, for a conventional fiberizer 20 having a 23 cm diameter spinner that is driven at 4000 revolutions per minute, the central air flow 66 through the duct assembly 64 should be in the range of between about 0.7 cubic meters per second to 1.2 cubic meters per second. The upper end 80 of the end tube 70 should be spaced between about 2 centimeters and 8 centimeters from the peripheral wall 32 of the spinner assembly bowl 30.

Preferably, the diameter of the riser tube 68 is large enough so that the portion of the fiber veil 44 that falls over the underlying part 118 of the riser tube will part and slide over the riser tube 68 without accumulating on the tube.

In order to enhance a uniform flow of the veil 44 (i.e., without any undulations that may be introduced by air currents outside the veil) a cylindrical housing 110 is mounted to substantially surround the fiber veil 44 beneath the upper end 80 of the end tube 70. The lower end 72 of the riser tube 68 extends through a correspondingly sized opening in the wall 112 of the housing 110. Consequently, the veil 44 falls between the housing 110 and the duct assembly 64, the housing serving as a shield that protects the integrity of the veil.

Preferably, a jet of air 114 is forced through a small nozzle 116 formed in the housing wall 112 immediately above the riser tube 68. The jet of air 114 prevents the accumulation of fibers at the junction of the housing 110 and the upper surface of the riser tube 68. It is contemplated that other mechanisms, such as deflector plates, could be used to prevent the fiber accumulation just mentioned.

Although the principles of the invention have been described and illustrated with reference to a preferred embodiment, it should be apparent to one of ordinary skill in the art that the invention can be further modified in arrangement and detail without departing from such principles. For example, a duct assembly can be incorporated to carry out the present invention without the need for the adjustment mechanisms described above. In this regard, a single-diameter continuous tube may be used in place of the combined riser tube and end tube mentioned above. Accordingly, the appended claims are intended to cover any such modifications as follow the scope of the invention.

I claim:

1. An apparatus for use with a rotary-type fiberizer that produces a tubular column of fibers flowing downwardly from a fiberizer spinner assembly, the apparatus comprising:
   a duct positioned beneath the fiberizer spinner and oriented for directing gas in the duct upwardly against the underside of the spinner assembly so that the gas is deflected against the interior of the tubular column of fibers; and
   gas supply means for forcing gas into the duct.

2. The apparatus of claim 1 wherein the duct includes a tubular end located beneath and spaced a distance away from the fiberizer spinner assembly.

3. The apparatus of claim 2 wherein the tubular end has a tapered diameter.

4. The apparatus of claim 2 further including adjustment means for adjusting the distance that the tubular end is spaced from the spinner assembly, thereby adjusting the velocity of the gas that is deflected against the fibers.

5. The apparatus of claim 1 further comprising a housing substantially surrounding the duct so that the column of fibers flows between the housing and the duct.

6. The apparatus of claim 1 wherein the duct is an elongated member having a first end located within the column of fibers and a second end located outside of the column of fibers, the second end being connected to the gas supply means.

7. The apparatus of claim 6 wherein at least part of the column of fibers flows across the duct, the apparatus further comprising deflection means for preventing fibers from accumulating on the duct.

8. An apparatus for controlling the flow of air beneath a fiberizer spinner assembly that rotates about a rotational axis, the apparatus comprising:
   an elongated duct having an upper end near the spinner assembly and concentric with the rotational axis, the duct being positioned to direct a column of gas toward the spinner assembly in a direction substantially parallel to the rotational axis.

9. The apparatus of claim 8 wherein the duct is arranged so that the column of gas is directed upwardly toward the center of the spinner assembly.

10. The apparatus of claim 8 wherein part of the duct has an outside diameter that increases in the downward direction.

11. The apparatus of claim 8 wherein the upper end of the duct is movable relative to the remaining portion of the duct, the apparatus further comprising adjustment means for changing the position of the upper end of the duct relative to the remaining portion of the duct.

12. The apparatus of claim 8 wherein the upper end is shaped to fit inside a generally tubular column of fibers that emanates from the fiberizer spinner assembly.

13. A method of treating a generally tubular column of fibers that flows downwardly from the rotating spinner assembly of a rotary-type fiberizer, the spinner assembly rotating about an axis, the method comprising the step of directing a column of gas upwardly through and parallel with the axis into contact with the underside of the spinner assembly so that the gas is deflected by the spinner assembly against the interior of the column of fibers.

14. The method of claim 13 wherein the directing step includes the step of locating an open end of an elongated tubular member at a location spaced from the underside of the spinner assembly and within the column of fibers so that the gas is directed upwardly through the tubular member.

15. The method of claim 14 wherein the directing step includes the step of surrounding a portion of the tubular member with a housing so that the column of fibers moves downwardly between the housing and the surrounded portion of the tubular member.

16. The method of claim 13 wherein the directing step includes the step of maintaining the temperature of gas below the melting temperature of the fiber column.

17. The method of claim 14 including the step of shaping the tubular member for directing the gas outwardly to enlarge the diameter of the fiber column.

18. The method of claim 13 wherein the directing step includes directing the column of gas at a flow rate of at least about 0.7 cubic meters per second.

* * * * *